(12) United States Patent
Shields

(10) Patent No.: US 11,865,745 B1
(45) Date of Patent: Jan. 9, 2024

(54) ASYMMETRICAL INDUSTRIAL MANUFACTURING RAPID PROTOTYPING SYSTEM AND METHOD FOR PRODUCING ARTICLES

(71) Applicant: The Government of the United States of America, as represented by the Secretary of the Navy, Arlington, VA (US)

(72) Inventor: Garry E. Shields, Ashburn, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 292 days.

(21) Appl. No.: 16/822,633

(22) Filed: Mar. 18, 2020

Related U.S. Application Data

(60) Provisional application No. 62/819,935, filed on Mar. 18, 2019.

(51) Int. Cl.
| | | |
|---|---|---|
| *B29C 33/38* | (2006.01) | |
| *B29C 44/12* | (2006.01) | |
| *B29C 39/10* | (2006.01) | |
| *B29K 75/00* | (2006.01) | |

(52) U.S. Cl.
CPC ......... *B29C 33/3842* (2013.01); *B29C 39/10* (2013.01); *B29C 44/12* (2013.01); *B29K 2075/00* (2013.01)

(58) Field of Classification Search
CPC ..... B29C 33/3842; B29C 39/10; B29C 44/12; B29C 2045/1693; B29C 33/3835; B60K 2370/177; A61B 2090/365; G06F 2111/18; G06T 19/006
See application file for complete search history.

(56) References Cited

U.S. PATENT DOCUMENTS

| | | | |
|---|---|---|---|
| 7,491,024 B2 | 2/2009 | Heinrichs et al. | |
| 7,651,305 B1 | 1/2010 | Boyd et al. | |
| 7,726,496 B2 | 6/2010 | Heinrichs et al. | |
| 7,753,222 B1 | 7/2010 | Heinrichs | |
| 8,083,448 B2 | 12/2011 | Heinrichs et al. | |
| 9,387,928 B1 | 7/2016 | Gentry et al. | |
| 9,650,136 B1 | 5/2017 | Haskin et al. | |
| 9,962,921 B1 | 5/2018 | Lyon | |
| 10,078,377 B2 | 9/2018 | Balan et al. | |
| 2016/0314623 A1* | 10/2016 | Coleman | B23D 59/00 |
| 2018/0168780 A1* | 6/2018 | Kopelman | A61C 5/44 |
| 2020/0125846 A1* | 4/2020 | Laughlin | B29C 70/30 |

\* cited by examiner

*Primary Examiner* — Stella K Yi
(74) *Attorney, Agent, or Firm* — Dawn C. Russell; Jesus J. Hernandez

(57) ABSTRACT

Systems and methods for designing and producing articles using augmented reality apparatus are provided. The articles may incorporate commercially-available off-the-shelf (COTS) components such as motors, power supplies, and/or propulsion systems for use as vehicles or vessels. The articles may also incorporate modular components, such as storage and/or building components. Methods and kits for producing the articles are also provided.

19 Claims, 6 Drawing Sheets

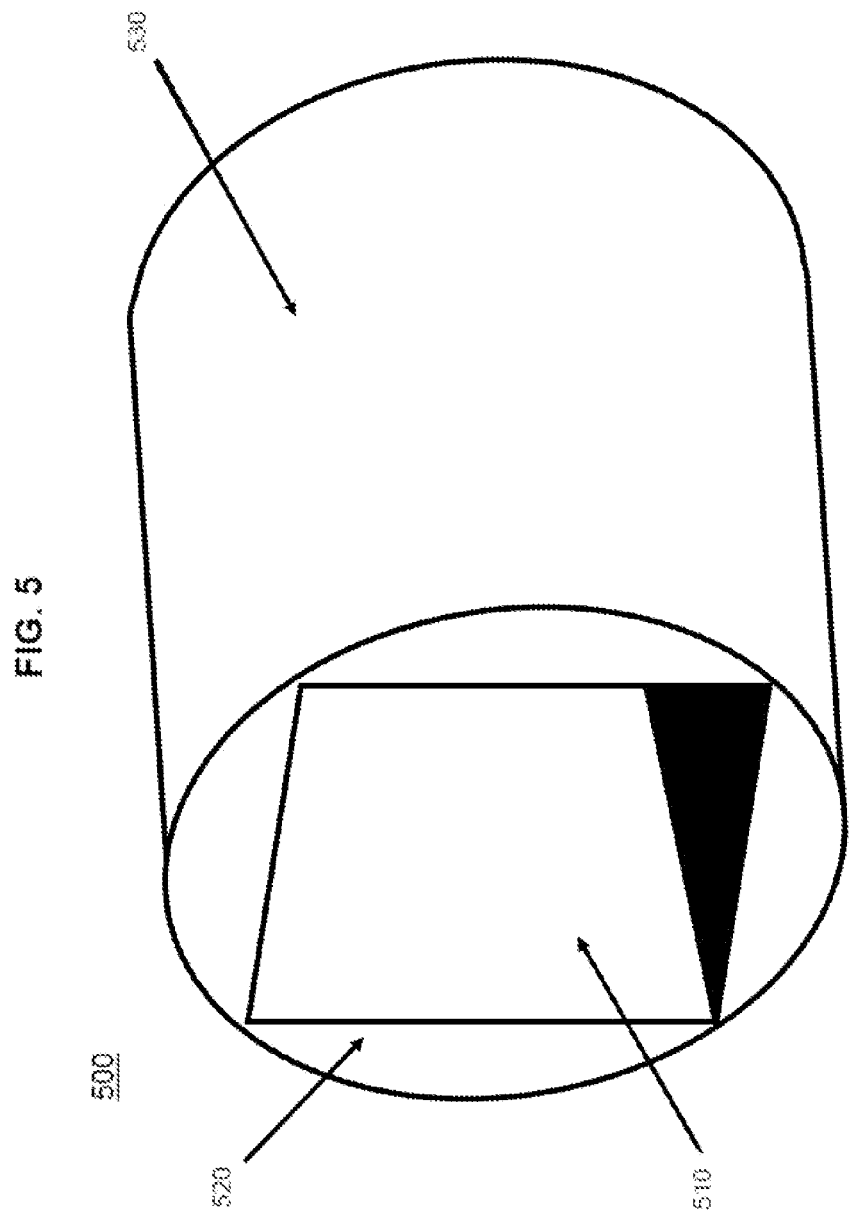

ASYMMETRICAL INDUSTRIAL MANUFACTURING RAPID PROTOTYPING SYSTEM AND METHOD FOR PRODUCING ARTICLES

CROSS-REFERENCE TO RELATED APPLICATIONS

This application claims priority under 35 U.S.C. § 119(e) to U.S. Provisional Application No. 62/819,935, filed on Mar. 18, 2019. The entire contents of this application are incorporated herein by reference.

FIELD OF THE INVENTION

Systems and methods for designing and producing articles using augmented reality apparatus are provided. The articles may incorporate commercially-available off-the-shelf (COTS) components such as motors, power supplies, and/or propulsion systems for use as vehicles or vessels. The articles may also incorporate modular components, such as storage and/or building components. Methods and kits for producing the articles are also provided.

BACKGROUND OF THE INVENTION

During a natural disaster, such as a flood or wildfire, it may be difficult to deliver supplies to an affected community. Depending to the volatility of the situation or the immediacy of the need, it may not be feasible or desirable to conduct a manned supply delivery operation. Furthermore, in spite of expansive infrastructure investments, there are still many communities around the world that remain difficult to access even under ideal conditions. Humanitarian Assistance/Disaster Relief (HA/DR) efforts supported by agencies such as the Department of the Navy (DON) can permit expeditionary operations in environments with limited resources, but additional support for the logistical challenges faced during these missions would greatly aid in their success.

Unmanned vehicles provide increased mobility in the air, on land, and underwater. Temporary storage facilities and shelters provide the ability to protect supplies and personnel. These articles beneficially reduce cost as compared to traditional manned vehicles and permanent structures.

However, currently-available unmanned vehicles, and temporary storage facilities and shelters, are expensive to produce, deliver, maintain, and operate, which is a critical factor in situations where the risk of damage or loss is high. In addition, if the unmanned vehicles and temporary storage facilities and shelters are not prepositioned in a location proximate to the area where they are needed, there can be an unacceptable delay in delivering the associated infrastructure within range, or building needed storage facilities and shelters on site.

Microsoft Technology Licensing, LLC has described a head mounted display (HMD) device incorporating sensors, cameras, projectors, displays, and processors that provide user interfaces for mixed reality systems (U.S. Pat. No. 10,078,377).

Amazon Technologies, Inc. has described drones for delivering a payload using an unmanned aerial vehicle (UAV), where the UAV is configured to hold a payload during flight to a delivery location, and release the payload upon arrival to the delivery location (U.S. Pat. No. 9,650,136). Multi-use UAV docking station systems and methods have also been described that include recharging/refueling stations for extending the range of UAVs (U.S. Pat. No. 9,387,928). Computer-implemented methods for obtaining information regarding an item, designing a container to store the item, and providing instructions to manufacture the container to a 3-D printer have further been described (U.S. Pat. No. 9,962,921).

The DON has developed collapsible container structures and rack systems that use a common support base, referred to as the Joint Modular Intermodal Container (JMIC) (U.S. Pat. Nos. 7,491,024; 7,651,305; 7,726,496; 7,753,222; 8,083,488).

However, the available technology does not address the need for rapid deployment of vehicles and structures tailored to an immediate operating environment.

There is a need in the art for lower-cost vehicles and structures that can be designed and fabricated quickly in the field, using locally-available resources, in response to immediate needs and changing situations.

SUMMARY OF THE INVENTION

The invention described herein, including the various aspects and/or embodiments thereof, meets the unmet needs of the art, as well as others, by providing systems and methods for designing and producing articles using augmented reality apparatus. The articles may be combined with commercially-available off-the-shelf components for use as unmanned vehicles, storage containers, and shelters.

In one aspect of the invention, a method for manufacturing an article includes: providing a blueprint of a mold corresponding to an article; storing the mold blueprint in a memory module of an augmented reality apparatus; projecting the mold blueprint onto an area where an article is to be manufactured, using a projector in communication with the augmented reality apparatus; forming a physical mold comprising a void in the shape of the article by removing material from the area where the article is to be manufactured, or building up material in the area where the article is to be manufactured, where the removed or built up material creates a physical mold; filling the physical mold with a mold-filling material to form the article; and removing the article from the physical mold.

In another aspect of the invention, a system for manufacturing an article includes: an augmented reality apparatus comprising a display, a scanner, a projector, a user input interface, a memory module comprising a blueprint of a mold corresponding to an article, and a processing apparatus, wherein the processing apparatus is programmed to project the mold blueprint onto an area where an article is to be manufactured; scan a physical mold formed based on the projected mold blueprint; compare the physical mold with the mold blueprint and identify differences; and display information corresponding to the differences between the physical mold and the mold blueprint.

In a further aspect of the invention, a kit includes: an augmented reality apparatus comprising a display, a scanner, a projector, a user input interface, a memory module comprising a blueprint of a mold corresponding to an article, and a processing apparatus; a mold-filling material; and additional components selected from the group consisting of motors, wheels, propellers, power supplies, sensors, GPS tracking devices, fasteners, storage containers, and rudders.

Other features and advantages of the present invention will become apparent to those skilled in the art upon examination of the following or upon learning by practice of the invention.

BRIEF DESCRIPTION OF THE DRAWINGS

FIG. 3A depicts a pontoon formed using multiple cylindrical articles. FIGS. 3B and 3C depict rafts formed using multiple cylindrical articles.

FIG. 4A shows a front view of the container, and FIG. 4B shows a side cutaway view of the container along line A-A'.

FIG. 5 depicts a perspective view of a shelter formed using a container, in accordance with the methods of the invention.

DETAILED DESCRIPTION OF THE INVENTION

Figure 1:
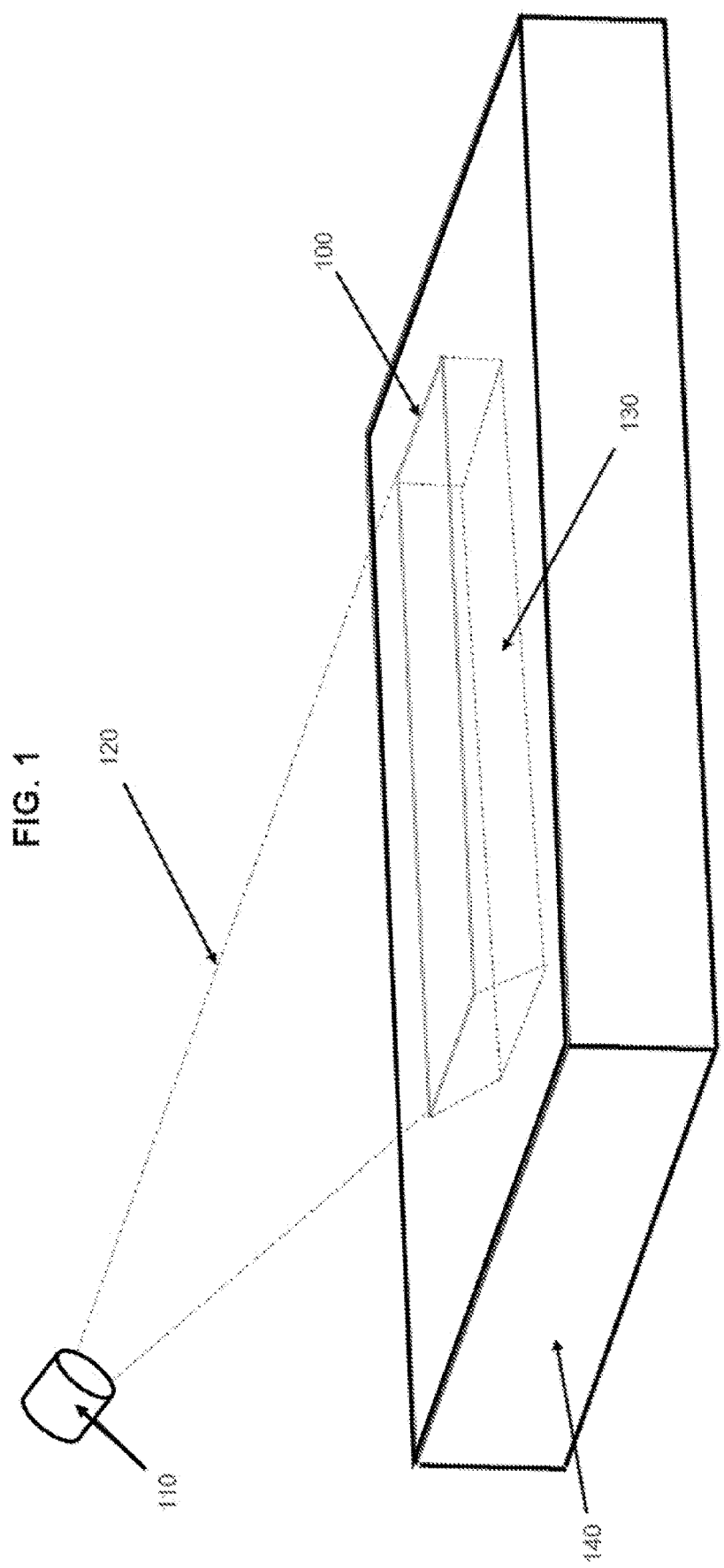
FIG. 1 depicts a mold image projected by the rapid prototyping system of the invention.

Although air drops and other supply operations may be conducted in support of HA/DR in affected communities, in certain situations more targeted solutions are beneficial. For example, critical medical supplies may benefit from being delivered directly to an on-site clinic. Protected storage facilities and shelters may be required in a disaster area.

In these and other situations, the systems and methods of the invention may be used by an operator in the vicinity to rapidly generate useful articles, such as expendable storage facilities or vessels capable of delivering supplies to the area in need. The systems and methods permit personnel to create useful articles tailored to their situations and environments.

Based on the situation, an operator using the systems and methods of the invention can scale the size of a vehicle or vessel to the supplies being delivered, and the environment where it will be used. Once fabricated, the systems and methods permit the operator to navigate the vehicle or vessel to its intended destination. The operator can also fabricate storage facilities for supplies, and create emergency temporary shelters as needed.

The invention beneficially permits personnel having minimal training to successfully construct multiple types of vehicles or vessels, and varying sizes of structures, thereby expanding ability to meet critical needs in locations where resources are limited, which may be spread out over a large area. The systems and methods of the invention beneficially permit failed designs to be modified quickly to address identified deficiencies, increasing the likelihood that future construction attempts will be successful.

Rapid Prototyping System

The prototyping systems of the invention incorporate several components that permit an operator to quickly create articles. Even personnel not trained in fabricating articles can produce field-ready solutions to address immediate needs using the systems.

The systems of the invention for manufacturing articles include an augmented reality apparatus. The augmented reality apparatus preferably includes a display, a scanner, a projector, a user input interface, a memory module comprising a blueprint of a mold corresponding to an article, and a processor. The processor includes software that instructs the augmented reality apparatus to project a mold blueprint onto an area where an article is to be manufactured; scan a physical mold formed based on the projected mold blueprint; compare the physical mold with the mold blueprint and identify differences; and display information corresponding to the differences between the physical mold and the mold blueprint. The software may also request and receive user input regarding various parameters, such as quantity and weight of items to be transported or stored, and locally-available materials.

The systems of the invention leverage the proliferation of handheld and head-mounted display (HMD) devices that provide an augmented reality experience. Augmented reality refers to technologies that superimpose computer-generated images, text, and other information on an operator's view of the world, resulting in a composite of real and virtual information.

Augmented reality apparatus suitable for use in the systems and methods of the invention can include multiple types of sensors, cameras, projectors, displays, antenna for receiving and transmitting data (including GPS, Bluetooth, wireless, and wired connections), memory modules, and processors programmed to carry out a variety of functions. They also include user input interfaces, which can be used by an operator, for example, to enter search parameters for article designs stored in the memory module, enter information regarding required capabilities of needed articles, and enter information regarding local resources available for use in building articles. The user input interfaces can be in the form of keyboard, stylus, touchpad, voice recognition software, gesture recognition software, and any other software for translating operator input into commands. Multiple user interfaces may be provided with the systems of the invention.

The augmented reality apparatus used in the systems of the invention are preferably handheld and HMD devices that incorporate several or all of these functionalities therein, or they may be configured to connect (wirelessly or via hardwired connections) to separate devices that provide these functions.

The augmented reality apparatus preferably operates as a standalone device, using processors programmed to execute computer-readable instructions stored in on-board memory module, so they are not dependent on ability to send or receive data transmissions. However, the augmented reality apparatus may be in communication with one or more general-purpose computers that execute computer-readable instructions stored in memory modules contained therein.

One presently-preferred augmented reality apparatus for use in the systems of the invention is the Microsoft HoloLens® (Microsoft Corporation, Redmond, WA), but the invention is not limited to use with this particular HMD device.

Regardless of particular configuration, the augmented reality apparatus used in the systems of the invention are programmed to use stored article designs selected by the operator, combined with visual data received by cameras (including, but not limited to, measurements of area suitable for building, measurements of dimensions of items to be stored or transported), and any additional parameters entered by an operator (including, but not limited to, weight of cargo, quantity of items to be transported or stored, dimensions of desired vessel, amount and type of material available locally) to project a three-dimensional image of a mold onto a surface. The mold may be based on a vehicle, vessel, or shelter design that is loaded into the computer-readable memory module of the augmented reality apparatus, or computer(s) with which they communicate. The mold may also be custom-designed by a system operator (e.g., a drawing made using paper and pencil, a figure created by tracing a finger or stick over sand or dirt) and scanned using the augmented reality apparatus to create a virtual blueprint for a mold.

The article designs and mold designs encompass highly-detailed product specifications, as well as images of simple line drawings made by operators sketching in sand with a finger. These images and designs may be referred to as blueprints herein, but it is to be understood that the invention is not limited to designs having any particular level of detail or complexity. One of the benefits of the systems and methods of the invention is in aiding operators in creating needed articles based on available supplies. In austere situations, the available supplies may be limited, and the operator may not have the capability to build articles to a high level of detail, but the design assistance provided by the systems and methods of the invention is also valuable in using limited supplies in the most effective manner possible.

As depicted in FIG. 1, in some aspects of the invention, an image of a mold 100 is projected using an augmented reality apparatus 110 that incorporates a camera or projector therein. In other aspects of the invention, the augmented reality apparatus may be used to transmit an image to one or more other projectors that may be used to create the image of the mold. For example, the projector used in communication with a handheld or HMID device may be provided on a pole or unmanned aerial vehicle (UAV), or positioned in an elevated location within the environment, and multiple projectors may be used together. These projectors may be used to project larger and/or more detailed images to be used in forming the mold.

After the (preferably three-dimensional) image has been created and projected 120, the operator forms one or more molds 130 based on the projected image using any available mold-forming material 140. In some aspects of the invention, the mold may be formed using materials found in the environment where the vehicle or vessel is made, such as snow, mud, clay, sand, rocks, rubble, and other shapeable debris. The mold may be formed by digging into sand or soil present in the operational landscape. Alternatively, the mold may be formed by building up walls using materials found in the environment, which can beneficially expedite removal of the object from the mold. The molds of the invention may also be formed using silicone rubber, urethane rubber, polysulfide rubber, urethane resin, or epoxy resin, particularly where smaller or more detailed molds are required.

Regardless of the mold shape or composition, after the mold is formed, it is partially or completely filled with a mold-filling material. For simple parts, the mold is completely filled and no further processing is required to create a functional molded article. For more complex molded articles, it may be beneficial to partially fill the mold, place one or more components to be incorporated into the molded article, and then continue filling the mold. The process of partially filling the mold or a portion thereof, incorporating a component, and then resuming mold filling may be repeated as needed, depending on the complexity of the article and the number and type of components incorporated therein. In some aspects of the invention, the augmented reality apparatus provides instructions to aid the operator in determining where and when to place specific components within the article as it is being molded.

The mold-filling material is not particularly limited, but is preferably non-volatile, does not dissolve or degrade in aqueous environments, and cures, sets, or hardens rapidly. In some aspects of the invention, the mold-filling material is resistant to degradation by fuel contaminants present in the environment. Foams, polymers, resins are useful as mold-filling materials. They are preferably provided in a form that is easily transported by the operator. One example of a foam that may be used in accordance with the systems and methods of the invention is expanding urethane foam. Other foams may also be used in accordance with the invention, particularly foams that are buoyant and rigid once cured, including polyurethane foam. Resin and rubber mold-filling materials may also be used. Optionally, mold-filling materials may be selected to address disposal or recycling concerns, for environmental purposes.

In some aspects, vehicle- or vessel-forming materials are selected based on their ability to resist degradation by local environmental hazards, including, but not limited to, heat, UV, salt, chemical agents, and radiation. The systems and methods of the invention preferably permit operators to input information regarding these and other environmental considerations that may impact the construction of articles.

Preferred vehicle- or vessel-forming materials of the invention are foams and polymers that can be customized to have differing densities and compositions. In some aspects of the invention, the material may be modified to have positive, neutral, or negative buoyancy in a fluid that supports the molded shape.

To increase buoyancy, inflatable bladders may be used to form a void or chamber in the mold as it is being filled with the mold-filling material. In some aspects, the inflatable structure may be deflated, and optionally removed, once the mold-filling material has hardened around it. However, in other aspects of the invention, it is beneficial to leave the inflated structure inside the completed, molded article. For example, if a fuel or water storage bladder is provided within a mold and surrounded by mold-filling material, a more durable storage bladder structure can be provided to facilitate fuel and water storage and delivery. In other aspects of the invention, the fuel or water storage bladder may be incorporated into a vehicle to provide a source of fuel for maneuver operations, or a source of water if the vehicle will be used to transport personnel.

To decrease buoyancy, additional materials may be incorporated into the mold-filling material, such as locally-available fill. For example, sand or rocks may be added into a positively-buoyant mold-filling material before it has cured in order to increase its density to a desired level. Adding fill the mold-filling material may also permit parts to be formed that are resistant to impact, or otherwise strengthen the molded articles.

Commercially-available, off-the-shelf motors, wheels, propellers, power supplies, sensors, GPS tracking devices, fasteners, storage containers, rudders, fuel bladders, and steering systems may be used in the asymmetrical industrial manufacturing rapid prototyping systems of the invention. These and other components may be incorporated into kits that also include an augmented reality apparatus, such as a HMD or handheld device, and mold-filling material. The kits of the invention may be provided as part of HA/DR efforts, or as standard equipment for personnel operating in environments with limited resources. For example, operators likely to need vessels designed for use in water may receive kits that incorporate motors, power supplies (e.g., battery packs, solar cells), propellers, and rudders, as well as buoyancy and/or weight sensors to detect when the payload of a vessel has been lost or removed.

The molds created using the systems of the invention may be designed to produce a unitary body or chassis for the vehicle or vessel. Vehicles designed for use on land may incorporate motors, power supplies, and wheels, as well as sensors. Vehicles and vessels of the invention may also include cameras and location tracking apparatus to provide the operator with information regarding their location. In some aspects of the invention, components that may be used to form parts of a vehicle or vessel may be incorporated into a uniform or other clothing article worn by an operator.

The systems of the invention beneficially permit users to rapidly design and produce articles for use in transporting and protecting supplies, equipment, and people in a manner that is both rapid and cost effective.

Figure 2:
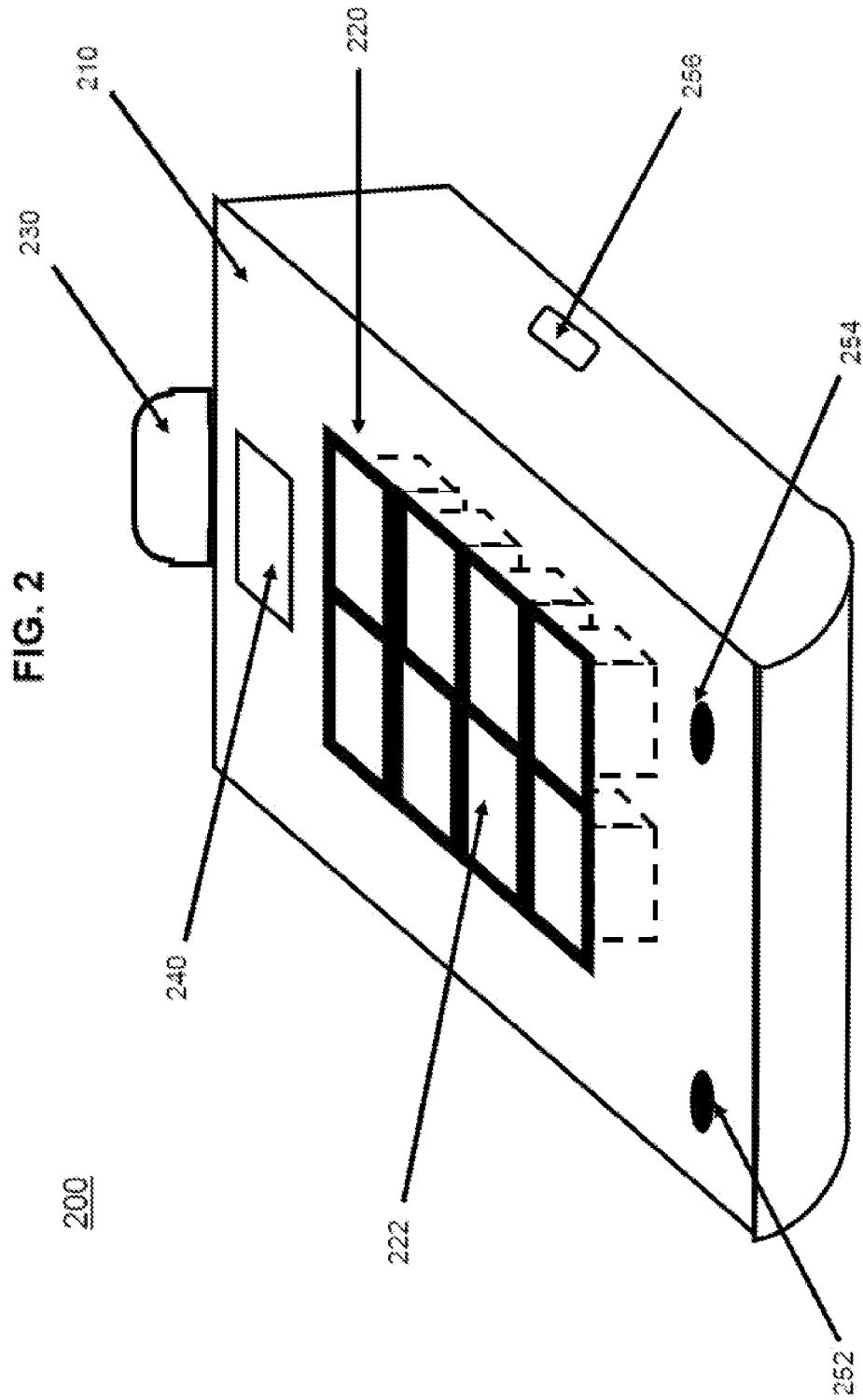
FIG. 2 depicts an unmanned watercraft for transporting supplies housed in containers formed using the mold of FIG. 1.

FIG. 2 depicts an exemplary transportation article 200 that can be produced using the systems of the invention. The article includes a shallow-water delivery platform 210 created using the system of the invention for creating molds and producing molded articles for transporting goods or equipment. It incorporates a propulsion system 230 and power supply 240 therein, as well as weight sensors 252, GPS sensors 254, and speed sensors 256 to facilitate tracking the article as it is maneuvered through an area of operation.

The platform shown in FIG. 2 also includes multiple housings for storage containers 220, where the size of the platform 210 depends on the number of storage containers and the weight of goods being transported. In one exemplary embodiment, the platform 210 is used for transporting U.S. Navy JMICs 222. JMICs are storage and shipping containers that include side and back supports and can interlock with other JMIC units vertically and horizontally. The supports protect cargo, and may be provided as solid panels or open lattice panels. Panels can open outward or be removed for immediate side access when multiple JMICs are stacked or horizontally linked together. Side components collapse down to the top of the pallet reducing space when the pallet is not loaded with cargo. Collapsed JMICs can also be stacked for easy return shipping in bulk. The contents of U.S. Pat. Nos. 7,491,024; 7,651,305; 7,726,496; 7,753,222; and 8,083,488, which describe various aspects of the JMIC, are incorporated herein by reference in their entireties.

FIG. 2 depicts a platform having capacity for 8 JMICs 222, though the articles of the invention are not limited to any particular number, type, or configuration of storage containers. In other aspects of the invention, from 1 to 20 containers may be delivered using the articles of the invention, preferably from 3 to 16 containers, more preferably from 5-12 containers. Although JMICs are one preferred type of container, the invention can be used to work with standard shipping pallets, or other custom-sized containers.

One consideration involved in selecting the number and size of containers to be delivered using the articles of the invention is weight. The platform 210 depicted in FIG. 2 is designed to support 2670 lbs in each of the 8 JMICs, for a total of 23,360 lbs (10.5 Short Tons). The estimated dimensions of the platform are 36 ft long, 12 ft wide, and 4 ft high. The completed platform has an estimated draft at full load of 2 ft. It is estimated that the weight of the foam platform required to support this cargo is approximately 3000 lbs. However, the articles of the invention are not limited to any particular size. Smaller vehicles may be designed to deliver smaller quantities of supplies.

According to another aspect of the invention, one or more molds may be created and used to produce multiple parts. The molded parts may have the same shape or different shapes, and can be assembled in any configuration after being removed from the mold (as shown in FIGS. 3A-3C).

Where a mold design is used to produce multiple parts having approximately the same shape, where the molded shapes can be assembled together to form a variety of different types of structures. Preferably, the parts have a shape that is cylindrical, though any shape or an amorphous shape may be used, based on the particular operational needs the structure is being designed address. The circular cross section of the cylindrical parts is beneficial in that it facilitates removal of the parts from the mold, as compared to parts having irregular or complicated surfaces. They may also exhibit better handling when navigated or towed through bodies of water, particularly where the bodies of water may contain obstructions or debris.

Figure 3B:
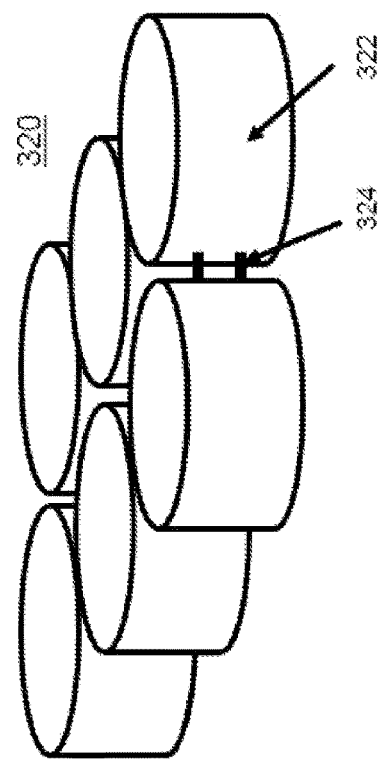
FIGS. 3A-3C depict structures formed by combining multiple molded articles.
Figure 3A:
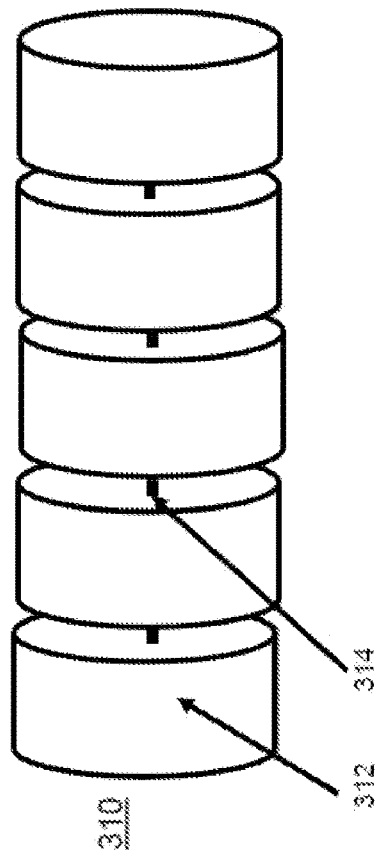

As shown in FIG. 3A, multiple cylindrical parts 312 can be formed using molds created by the systems of the invention. These parts 312 are then assembled by attaching them together at attachment points 314 that may be incorporated into each molded part as it is formed, or affixed to the molded part 312 after it has cured. Any number of individual cylindrical parts 312 may be linked together to form a cylinder 310, where the length is customized for a particular task. This aspect of the invention may be used to create pontoons, for example. Multiple pontoons may in turn be used to create a barge.

Figure 3C:
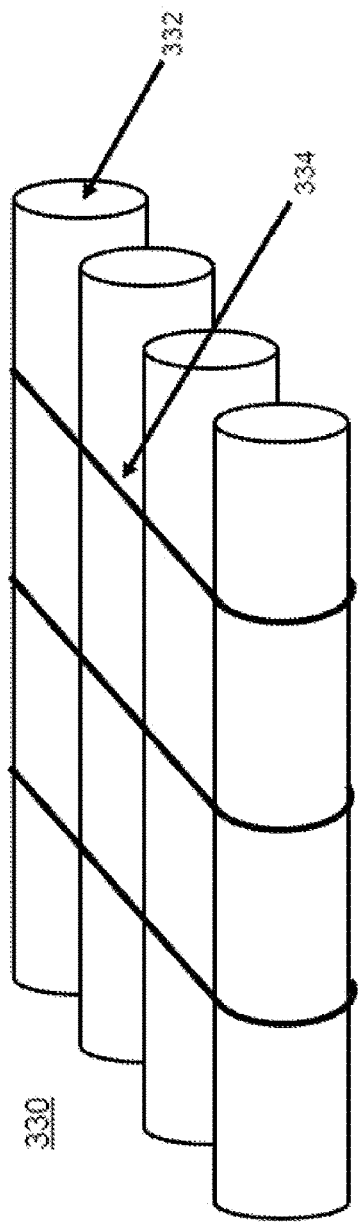

As shown in FIGS. 3B and 3C, molded cylindrical parts 322, 332 may be assembled using attachments 324, 334 to create platforms 320 and 330. The attachments may be formed such that they are integrated into the parts as they are being molded, affixed to the molded parts once it has been removed from the mold, or wrapped around the parts after they are molded, depending on the structure being formed and the attachment apparatus available. The attachment means are not particularly limited, and include rope, wire, chain, hooks, etc.

Figure 4B:
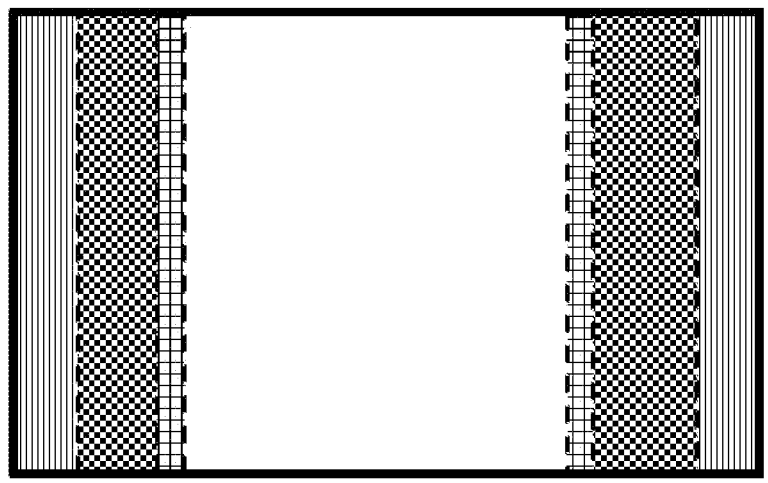
FIGS. 4A-4B depict a container surrounded by a buoyant layer, with an optional outer layer surrounding the buoyant layer. The container is designed to be towed by another watercraft.
Figure 4A:
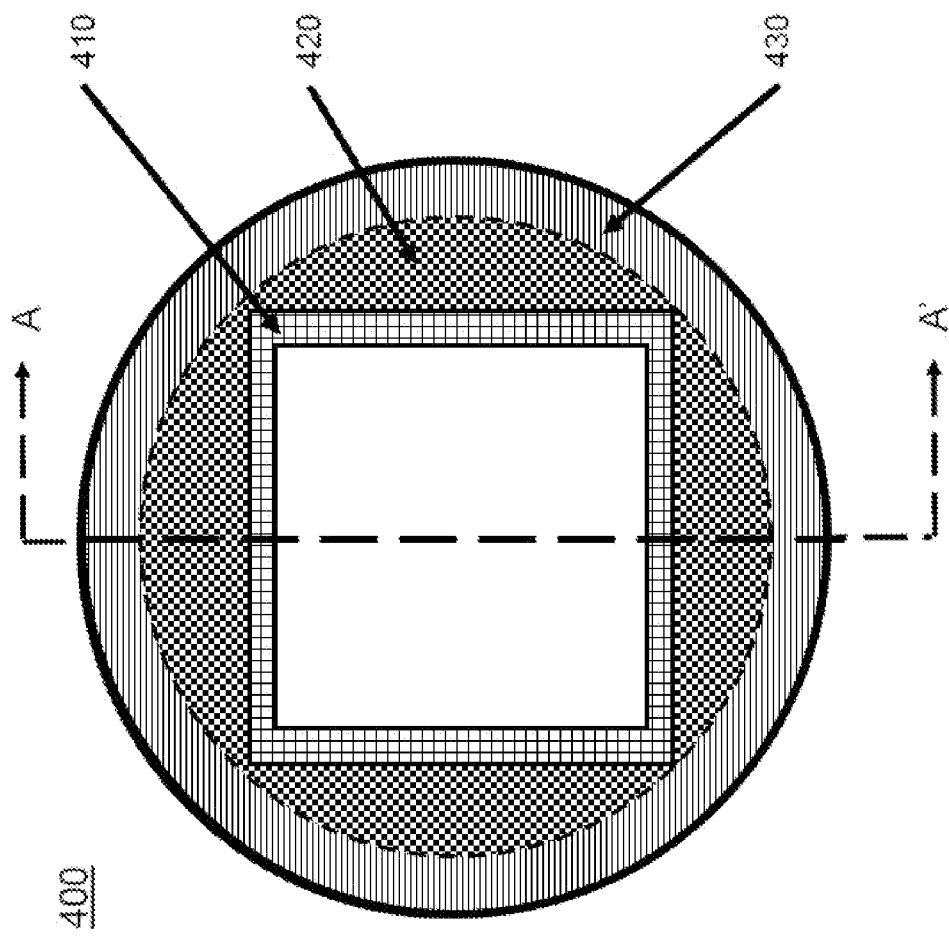

FIGS. 4A-4B depict an alternative transportation/storage article 400 produced using the systems of the invention. The article 400 encases a storage container 410 in a sufficient amount of mold-filling material 420 to permit the storage container 410 to float, but typically will not incorporate propulsion systems or sensors. The storage container is depicted as being surrounded by a cylindrical expanse of mold-filling material, but the invention is not limited to any particular shape so long as sufficient mold-filling material is used to permit the storage container to float, although cylinders are preferred for ease of removing the cured article from the mold. The floating storage article may float on its flat, round face, or on its curved sidewall, as desired.

The floating storage article 400 of FIGS. 4A-4B is depicted with an optional outer layer 430. The outer layer 430, when present, may be formed using additional mold-filling material. In some aspects of the invention, the outer layer 430 incorporates additional materials from the surrounding environment to camouflage the floating article. Military-issue camouflage materials may also be used.

As shown in FIG. 4B, which is a cutaway view of FIG. 4A taken along line A-A', the rectangular storage container 410 is surrounded by the mold-filling material 420 on four of its sides, and access to any contents may be provided from two opposing sides. However, the invention is not limited to any particular storage container shape or number of access points. The floating storage article 400 of FIG. 4B could be additionally configured with mold-filling material on either or both of the sides that are depicted as being exposed for access.

Optional attachment equipment (such as a chain, hook, or other attachment means, not shown) may be affixed to the storage container at one or more points that protrude through the molded floating article to permit it to be towed by a vessel or attached to a shore asset, such as a dock or bridge, thereby providing floating storage. In some aspects of the invention, the storage container is a JMIC, but the invention may incorporate any suitable storage container.

The systems of the invention may also be used to create articles 500 that may be used as storage facilities and shelters for supplies, equipment, and/or people. An example of a storage facility is depicted in FIG. 5.

The configuration of the storage facilities or shelters vary depending on the local circumstances. Apparatus 510, which may be a container used to store and transport supplies (i.e., shipping pallets, JMICs) may be incorporated into a mold that is filled with material 520 (i.e., expanding foam) in order to provide protected storage facilities and shelters in austere environments. The outer surface 530 of the storage facilities and shelters in accordance with the invention may optionally be partially or fully recessed into the surrounding terrain to provide additional insulation or protection for the contents.

In some aspects of the invention, shelters may be formed using multiple floating storage container articles of FIGS. 4A-4B, laid end-to-end along the central axes of the cylinders. This permits the formed articles to be re-purposed depending on the needs of the mission.

In more austere operating environments, the systems of the invention may be used to create storage facilities or shelters using the mold-filling materials, optionally combined with materials scavenged from the local environment. These materials may include discarded shipping pallets, branches or other vegetation, which may be incorporated into a single molded component, or into multiple molded components that may be assembled to form the structure.

Rapid Prototyping Methods

The methods of the invention beneficially permit operators to manufacture articles using materials available in their environment.

The methods may include: providing a blueprint of a mold corresponding to an article; storing the mold blueprint in a memory module of an augmented reality apparatus; projecting the mold blueprint onto an area where an article is to be manufactured, using a projector in communication with the augmented reality apparatus; forming a physical mold comprising a void in the shape of the article by removing material from the area where the article is to be manufactured, or building up material in the area where the article is to be manufactured, where the removed or built up material creates a physical mold; filling the physical mold with a mold-filling material to form the article; and removing the article from the physical mold.

Figure 6:
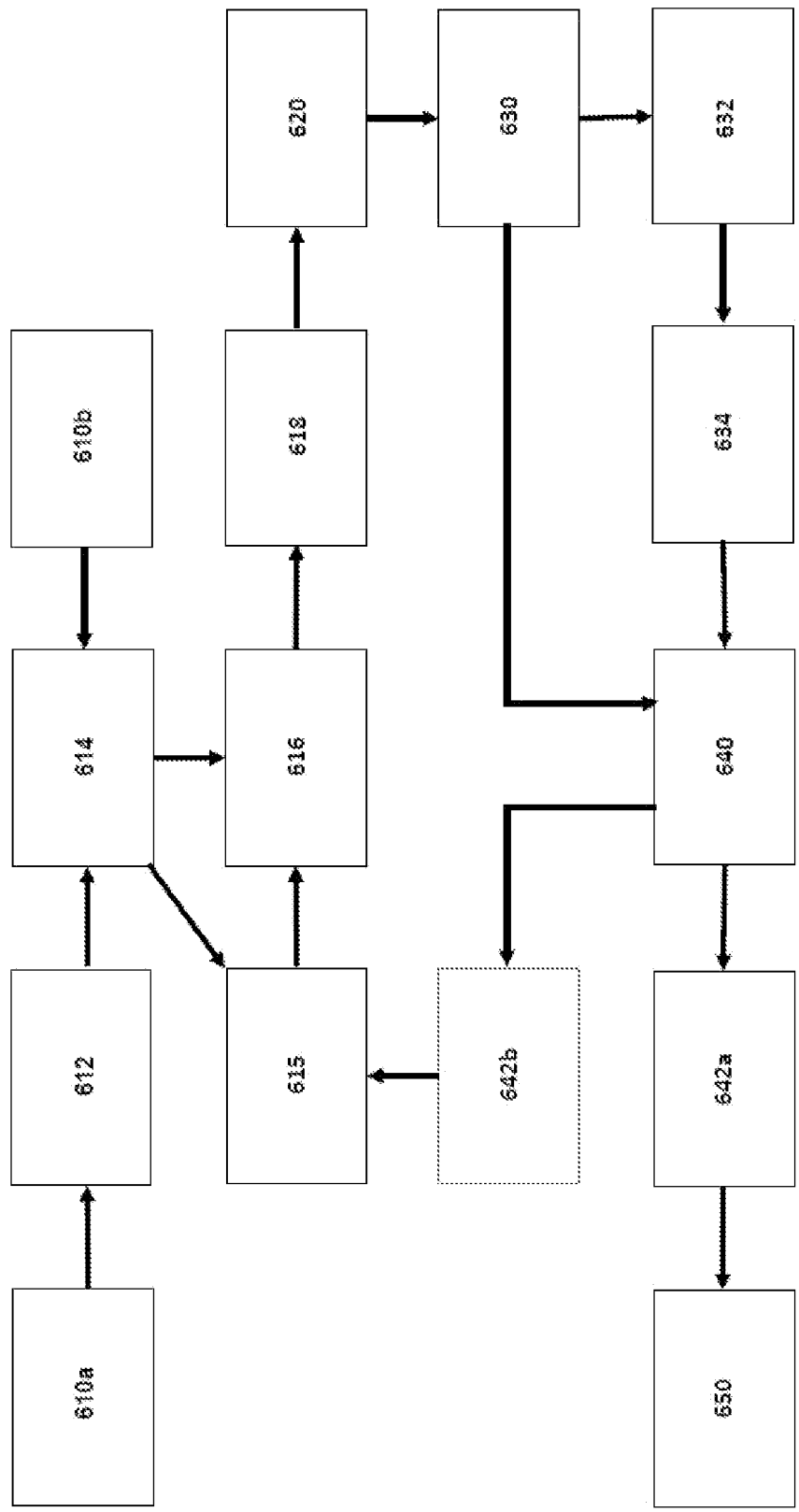
FIG. 6 is a flowchart depicting the methods of the invention for creating molded objects.

The methods of the invention are described in more detail with respect to the flow chart shown in FIG. 6, which depicts one exemplary embodiment of the steps that may be used to implement the methods of the invention. The flow chart illustrates elements that may be incorporated into software that is implemented by the systems and methods of the invention.

The software instructions may be stored in a memory module and executed remotely by a processor in a computer that is in communication with an augmented reality apparatus used in the systems and methods of the invention. The software may also be stored in a computer-readable memory provided in the augmented reality apparatus, and executed locally by a processor provided in the augmented reality apparatus. Those skilled in the art will recognize that the methods of the invention may be implemented using other computer systems and/or architectures, and the methods of the invention are not limited to any particular configuration.

In some aspects of the invention, the methods for forming articles can be generally broken down into five categories of steps: (1) steps for creating a blueprint of a mold using the augmented reality apparatus; (2) steps for creating a mold having a void corresponding to the article being formed by projecting an image of the mold blueprint onto an area where a mold is to be formed; (3) steps for forming the article by filling the mold; (4) steps for field testing the formed article; and (5) using the article in the field.

In the first set of steps, the methods of the invention include designing a vehicle or vessel (610a), or selecting a blueprint from pre-existing designs stored in a memory module that can be accessed by the operator using an operator interface or input device, such as an interface provided by the augmented reality apparatus (610b).

When an operator desires to create a custom blueprint in step 610a, a design for the desired article may be created in step 612 via a user input device (i.e., using an interface provided by the augmented reality apparatus). Alternatively, the design may be created in step 612 using pen and paper or traced on any available surface, followed by scanning the sketch using a camera or other scanning module incorporated into the augmented reality apparatus, or in communication with it.

As another alternative, if a custom vehicle or vessel is being created, rather than projecting an image of a pre-existing vessel design, the operator may instead create a design in step 612 by preparing a rough mold in a desired and size in an area using any available movable or formable material found on-site, or a dedicated foam or resin mold-forming material. An image of the operator's desired mold is then scanned into the system using the augmented reality apparatus. Additional information regarding the desired dimensions of the model may be input by the operator into the augmented reality apparatus, or the augmented reality apparatus may have onboard measurement capabilities, as discussed above. The processor of the augmented reality apparatus compares the scanned mold to the input information, and identifies deviations. The processor may identify areas of deviation for the user, for example, by instructing a projector to display areas of deviation using contrasting colors, for example.

Regardless of whether the design for the article is custom-created by the operator or selected from article designs stored in a memory module, in step 614 the processor instructs the operator to scan the local environment. This provides the augmented reality apparatus with information regarding the area available for building the article, and may be combined with optional inputs from the operator regarding the amounts and types of mold-forming material and mold-filling material available. This information is used by the processor of the augmented reality apparatus to calculate the size of the article that can be formed. A blueprint for the article is generated by the handheld or HMD device based on this information.

The blueprint generated by the handheld or HMD device in step 614 may optionally be edited by the operator in step 615 using the operator interface. The operator can customize the blueprint to address environmental constraints, or incorporate additional features or components.

The completed blueprint is projected onto the local surroundings in step 616. The augmented reality apparatus is equipped with image projection apparatus, and is preferably used for this step, although a separate projection apparatus in communication with a handheld or HMD device may also be used. In some aspects of the invention, the separate projection apparatus may be provided on a UAV (i.e., a drone) or pole, or placed in an elevated area within the operator's environment, providing the ability to project the image onto a surface from above.

In optional step 618, the size of the projected image may be further manipulated by the operator in order to fit within the space available for the mold constructing and filling operations, or to re-size the projected design to better accommodate the supplies, equipment, and/or personnel it is being used to transport or store. The placement of the projected image of the mold blueprint may also be moved to a different location.

In the second set of steps, a mold that will be used to form one or more articles is created.

In step 620, a physical mold is created in the operator's environment based on the blueprint for a mold that is stored or created in the handheld or IMID device.

The area where the image is projected can be in any location so long as movable or formable material is present (or can be provided) that can support sprayed or poured mold-filling material. For example, a snowbank; a muddy or swampy area; a sandy or rocky beach; or an urban area with rubble, debris, or garbage may be selected. In other aspects of the invention, a lightweight mold-forming material (such as a foam, resin, optionally mixed with a release aid) may be used to create all or a portion of the mold, or to provide an optional lining in the mold created in the movable or formable material. This is particularly useful when the movable or formable material is unable to maintain a desired mold shape without additional support.

In order to create the mold, and image of the final blueprint is projected onto the area where the article is to be formed. One or more operators use the movable or formable materials found in the area to dig out a mold for the article, or build up the movable or formable materials above a base level to create a temporary mold for fabricating the article, using the image projected by the augmented reality apparatus as a guide. As the mold is being created, measuring devices such as field-improvised measurement units, laser measurement tools, etc., may be used to provide additional information to the processor associated with the augmented reality apparatus regarding the dimensions of the mold being constructed. Alternatively, the augmented reality apparatus may incorporate modules for assessing dimensions in the cameras, scanners, or other visualization tools provided therein.

The augmented reality apparatus may also optionally be used by the operator to scan the mold as it is being created, where the scanned information is used as an input, and the processor compares the as-created mold to the selected mold template. These optional additional scans may be used to ensure that the mold being created approximately conforms to the desired design. For example, by comparing images of the actual mold being created and the selected design, the processor can identify deviations before the molded articles are cast. The processor may identify areas of deviation for the user, for example, by instructing the projector to project an image onto areas of deviation using contrasting colors (one color where an area has had too much material removed, and another color where an area has not had enough material removed), for example.

In the third set of steps, the finished mold is used to fabricate one or more vehicles or vessels.

Once the mold has been completed, step 630 includes introducing a mold-filling material into the mold using any suitable technique. The mold-filling material may be sprayed, poured, or painted, for example, and allowed to expand, contract, harden, or cure, depending on the selected mold-filling material. For molded articles that do not incorporate additional components and have uncomplicated shapes, step 630 may be carried out as a single step, and the article may immediately proceed to field testing 640.

In some aspects of the invention, the article may also be formed in stages. In this aspect of the invention, step 630 may involve only partially filling the mold with mold-filling material. In step 632, components needed for the final article may be added to the partially-filled mold. In step 634, the mold is filled with additional mold-filling material. Steps 632 and 634 may be repeated as needed until all components are incorporated into the molded article, and the mold is completely filled. For articles that have complicated shapes, multiple layers of mold-filling material may be needed, particularly in instances where a non-expanding material is used as the mold-filling material.

During the vehicle or vessel fabrication process of step 630 (and optionally also steps 632, 634, as needed), the augmented reality apparatus may also be used to scan the article being formed as the material is added to the mold. The processor uses these optional additional scans to compare the article as formed with information regarding the selected design and any additional parameters input by the operator. In addition, by comparing images of the empty mold and the mold as it is in various stages of being filled, areas that have not been filled sufficiently or have been overfilled with the mold-filling material can be identified by the processor and displayed for the operator along with instructions for correcting deviations. Areas of deviation may be identified for the user, for example, by projecting an image onto the areas of deviation using contrasting colors, for example. One color may be selected to indicate that an area is not sufficiently filled, and another color may be selected to indicate that an area is over-filled. Actual positions of any optional components placed in the mold may also be compared to the virtual blueprint using the augmented reality apparatus, where the processor instructs the projector to output an image showing discrepancies between the actual positions of the components versus their expected positions.

The augmented reality apparatus processor may also executed stored software used to make calculations of the buoyancy required to deliver an anticipated payload using the vessel if an estimated payload weight is provided. This buoyancy calculation may also be used to provide feedback to the operator regarding the suggested size (i.e., dimensions, volume by displacement) and composition of the mold-filling material to be used to transport the payload.

The augmented reality apparatus may also assist the operator in placing any motors, battery packs, solar cells, tracking devices, and steering apparatus within the vehicle or vessel as it is being formed, particularly where a pre-existing design is selected. An image showing where these and other components are to be placed may be projected onto the vessel as it is being formed.

After fabrication, the article may be removed from the mold (for example, when the mold was dug into the environment), or the mold may be removed from the article (for example, when the mold was built up using found materials). In some aspects of the invention, the mold may be reused multiple times.

As another alternative, the article may be formed using multiple parts having the same or similar shape and dimensions. For example, a cylindrical part may be used to create a longer cylinder, where multiple cylinders are used together to create pontoons, barges, platforms, or other structures.

The same mold may be reused to make multiple parts, or multiple molds may be formed, or a combination of these.

In the fourth set of steps, the article is removed from the mold and optionally field tested 640, to ensure that the completed article functions for its intended purpose in the environment where it will be used. For articles that are vehicles or vessels, they may be loaded with a desired payload or weighted using materials found in the environment, and maneuvered through a test run. Field testing of vehicles may not be carried out in the event that the article is needed urgently. For articles that are used for storage or shelter, field testing may be limited to confirming that the article is capable of holding the objects or personnel to be protected. The field test 640 will reveal that the completed article either functions (642*a*) or does not function (642*b*). This information may be entered into the augmented reality apparatus. If the article does not function, then a step of editing the mold blueprint 615 may be implemented using the augmented reality apparatus in order to address flaws in the design of the mold or article. The modified blueprint may then be stored in the memory of the augmented reality apparatus and used to create a revised mold and device by returning to step 516.

If the article functions properly during the field test (642*a*), the operator can proceed to the fifth set of steps, use of the finished article in the field 650. This may optionally include loading the vehicle or vessel with supplies, equipment, and/or personnel. Navigation may be accomplished directly by boarding the vehicle or vessel, or by remotely controlling the vehicle or vessel using the augmented reality apparatus or a separate remote control apparatus. Information regarding the current location, speed, and direction of travel of the finished article may be obtained if the article was equipped with a GPS module. Autonomous waypoint navigation controls and operations are options as well. The signals used to operate and track the vehicle or vessel are preferably wireless.

When used in the field to deliver supplies, the articles of the invention, upon reaching their intended destination, may transmit a signal to the operator that indicates that the cargo has been successfully retrieved. The signal may be transmitted by a weight or buoyancy sensor provided in the vehicle or vessel. Upon receipt of the signal, the operator can then use the motors and/or steering apparatus to cause the vehicle or vessel to return to the operator, or continue on to another location. However, in some instances it is envisioned that the vehicle or vessel may not be retrievable due to damage occurring during the transportation and delivery process.

Due to the expendable nature of the vehicles and vessels produced using the systems and methods of the invention, the loss of one or more vehicles or vessels does not have a significant impact on the overall effort to deliver supplies and equipment, as replacement vehicles or vessels can be rapidly produced using design information saved in the memory module provided in the augmented reality apparatus, or previously transmitted to a remote data storage medium.

Use of the finished article in the field in step 650 may also encompass using a completed storage facility or shelter to protect equipment and/or personnel. The systems and methods of the invention permit the operator to generate an inventory of the location and contents of each facility or shelter that is stored in the memory of the augmented reality apparatus. Optionally this information may be wirelessly transmitted to a central data storage apparatus. This information may then be accessed by other personnel operating in the area.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A method for manufacturing an article, comprising:
providing a blueprint of a mold corresponding to an article;
storing the mold blueprint in a memory module of an augmented reality apparatus;
receiving scanned information regarding an area available for manufacturing the article;
receiving user-input on amounts and types of mold-forming material and mold-filling material available, wherein the mold-filling material is a substance that can be one of sprayed poured, and painted;
generating an updated blueprint utilizing the scanned information regarding the area available for manufacturing the article the user-input on the amounts and types of mold-forming material and mold-filling material available, and at least one of the provided blueprint and the stored mold blueprint;
projecting one of the stored mold blueprint and the updated blueprint onto an area where the article is to be manufactured, using a projector in communication with the augmented reality apparatus;
forming a physical mold comprising a void having a shape corresponding to the article by removing material from the area where the article is to be manufactured, or building up material in the area where the article is to be manufactured, where the removed or built up material creates a physical mold;
filling the physical mold with a mold-filling material to form the article; and
removing the article from the physical mold.

2. The method of claim 1, where the mold-filling material is selected from a group consisting of resin, foam, and polymer.

3. The method of claim 2, where the foam is selected from a group consisting of urethane foam and polyurethane foam.

4. The method of claim 1, where the augmented reality apparatus is a head-mounted display (HMD).

5. The method of claim 1, where the augmented reality apparatus is a handheld device.

6. The method of claim 1, further comprising placing components into the mold while it is being filled with the mold-filling material.

7. The method of claim 1, where the components are selected from the group consisting of motors, wheels, propellers, power supplies, sensors, GPS tracking devices, fasteners, storage containers, and rudders.

8. The method of claim 1, where the augmented reality apparatus scans the formed mold and identifies areas where the formed mold deviates from the mold blueprint.

9. The method of claim 1, where the augmented reality apparatus scans the mold as it is being filled and identifies areas where the filled mold deviates from the article.

10. A system for manufacturing an article, comprising:
an augmented reality apparatus comprising a display, a scanner, a projector, a user input interface for entering information including a user-customized blueprint of a mold corresponding to the article, a memory module comprising a stored blueprint of a mold corresponding to an article, and a processing apparatus,
wherein the processing apparatus is programmed to:
receive the user-customized blueprint of the mold;
receive the stored blueprint of the mold from the memory module;
receive scanned information regarding an area available for manufacturing the article;
receive user-input on amounts and types of mold-forming material and mold-filling material available, wherein the mold-filling material is a substance that can be one of sprayed, poured, and painted;
generate a blueprint utilizing the scanned information regarding the area available for manufacturing the article, the user-input on the amounts and types of mold-forming material and mold-filling material available, and one of the user-customized blueprint or the stored blueprint from the memory module,
project the generated blueprint onto the area available for manufacturing the article;
scan a physical mold formed based on the projected blueprint;
compare the physical mold with the projected blueprint and identify differences; and
display information corresponding to the differences between the physical mold and the mold blueprint.

11. The system of claim 10, where the augmented reality apparatus is a head-mounted display (HMD).

12. The system of claim 10, where the augmented reality apparatus is a handheld device.

13. The system of claim 10, where the processing apparatus is further programmed to:
scan the physical mold after it is filled;
compare the filled physical mold with the blueprint of the article being manufactured and identify differences; and
display information corresponding to areas where the filled mold deviates from the blueprint of the article being manufactured.

14. The system of claim 10, where the processing apparatus is further programmed to:
scan locations where components are placed as they are added to the physical mold;
compare the locations where the components are placed in the physical mold with the locations where the components are found in the blueprint of the article being manufactured and identify differences; and
display information corresponding to deviations in locations of components in the article from the locations of the components in the blueprint of the article being manufactured.

15. A kit, comprising:
an augmented reality apparatus comprising a display, a scanner, a projector, a user input interface, a memory module comprising a stored blueprint of a mold corresponding to an article, and a processing apparatus;
a mold-filling material; and
additional components selected from the group consisting of motors, wheels, propellers, power supplies, sensors, GPS tracking devices, fasteners, storage containers, and rudders,
wherein the processing apparatus is programmed to
receive a user-customized blueprint of the mold;
receive the stored blueprint of the mold from the memory module;
receive scanned information regarding an area available for manufacturing the article;
receive user-input on amounts and types of mold-forming material and mold-filling material available, wherein the mold-filling material is a substance that can be one of sprayed, poured, and painted;
generate an updated blueprint utilizing the scanned information regarding the area available for manufacturing the article, the user-input on the amounts and types of mold-forming material and mold-filling material available and one of the user-customized blueprint or the stored blueprint.

16. The system of claim 10, where the mold-filling material is non-volatile, does not dissolve or degrade in aqueous environments, and at least one of cures rapidly, sets rapidly, and hardens rapidly.

17. The system of claim 10, where the mold-filling material is selected from a group consisting of resin, foam, and polymer.

18. The system of claim 10, where the mold-filling material is a foam selected from a group consisting of urethane foam and polyurethane foam.

19. The kit of claim 15, where the mold-filling material is non-volatile, does not dissolve or degrade in aqueous environments, and at least one of cures rapidly, sets rapidly, and hardens rapidly.

* * * * *